United States Patent
Belart et al.

[15] 3,670,122
[45] June 13, 1972

[54] WARNING DEVICE FOR DUAL CIRCUIT HYDRAULIC BRAKE SYSTEMS

[72] Inventors: Juan Belart, Walldorf; Ulrich Seidel, Wehr, both of Germany

[73] Assignee: ITT Industries, Inc.

[22] Filed: Dec. 4, 1970

[21] Appl. No.: 95,308

[30] Foreign Application Priority Data

Dec. 10, 1969 Germany..................P 19 61 845.2

[52] U.S. Cl. ................................200/82 D, 200/153 LA
[51] Int. Cl. ..........................H01h 35/38, H01h 3/42
[58] Field of Search ..........................200/82 D, 153 LA

[56] References Cited

UNITED STATES PATENTS

| | | | |
|---|---|---|---|
| 3,536,874 | 10/1970 | Van Ophem | 200/82 D |
| 3,439,139 | 4/1969 | Stelzer | 200/82 D |
| 3,192,350 | 6/1965 | Horberg, Jr. | 200/153 LA UX |
| 2,764,176 | 9/1956 | Darquier | 200/82 D UX |
| 3,394,401 | 7/1968 | Roberts | 200/82 D |
| 3,480,333 | 11/1969 | Stelzer | 200/82 D X |

Primary Examiner—Robert K. Schaefer
Assistant Examiner—Robert A. Vanderhye
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A warning device for indicating the failure of one circuit in a two-circuit brake system. Two pistons in a closed cylinder are normally balanced by the pressure from one circuit acting on the outside of one piston and the pressure from the other circuit acts on the outside of the other piston. The inside ends of the pistons are tapered cam surfaces against which a cam follower is spring biased. A contact switch movable with the cam follower is closed when the pistons move to either end of the cylinder due to a pressure failure in one circuit.

A pressure medium groove is provided connecting the space between the two pistons to the chamber in which the switch is located. This latter chamber is vented to the atmosphere. This draws attention to a leaking seal of either or both pistons of the warning device. A check valve is provided between the space between the two pistons and the atmosphere to allow leaking hydraulic fluid to flow out while preventing foreign matter from entering the brake system.

5 Claims, 2 Drawing Figures

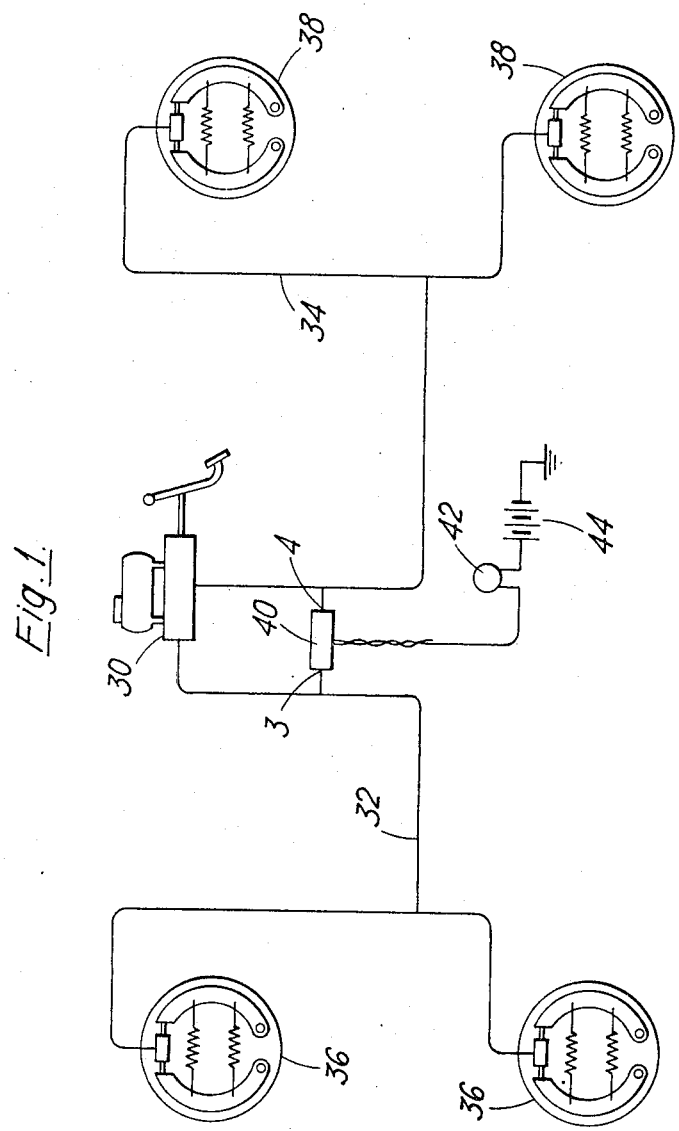

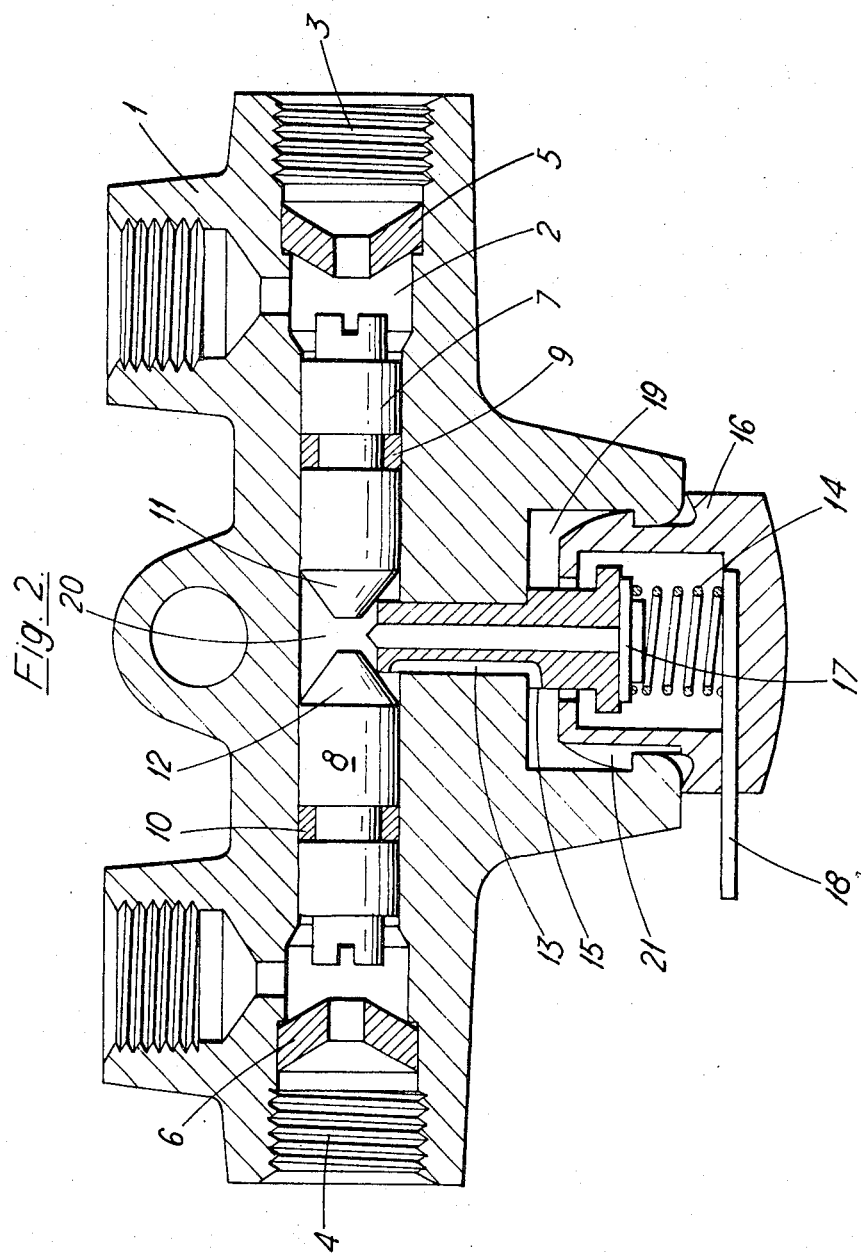

WARNING DEVICE FOR DUAL CIRCUIT HYDRAULIC BRAKE SYSTEMS

BACKGROUND OF THE INVENTION

This invention relates to an indicating device for generating a signal when a pressure difference exists between two hydraulic circuits which normally operate at the same pressure such as dual circuit hydraulic brake systems for road vehicles and particularly to an indicating device of this type having two pistons in a closed cylinder with the piston faces remote from each other acted upon by the pressure medium circuits which have to be separated.

In such indicating devices it is important to seal the two pressure medium circuits against each other so that when one circuit fails a warning signal is given and simultaneously the piston in the cylinder is pressed against a stop to maintain at least one circuit operative.

British Pat. No. 999,538 discloses a warning device of this type for two-circuit vehicle brake systems in which two pistons are arranged to slide in a common cylinder and are acted upon by the pressure in the brake lines and in which electric contact switches are actuated by said pistons. A disadvantage of these warning devices is that in case of a failure of one brake circuit a large displacement of the pistons is necessary in order to ensure a reliable reaction of the electric switch. An important disadvantage of the relatively large displacement is that the idle travel of the brake pedal — which of course has to be limited — is unduly extended. The piston which is acted upon by the pressure medium of the operative brake circuit is influenced by the least leakage in one of the two brake circuits because there is no venting of the intermediate chamber. The respective piston does not move until the force which results from the absolute pressure in the brake circuit acting upon the piston, is larger than the force of the adjusting spring biasing the pistons apart. This, however, has a negative influence on the sealing ability of the packings.

SUMMARY OF THE INVENTION

An object of the invention is to achieve a particularly small pressure medium displacement in such warning devices and a small displacement of the piston seals upon each braking action. The device should operate without an adjusting spring and should have a fixed switch point for the warning indication. With fewer and less expensive parts for the warning device a more reliable function and a more compact type of construction should be achieved.

To achieve these objects and advantages this invention provides that both piston front faces disposed opposite each other have tapered guiding surfaces and that the end of a switch pin lies against said tapered guiding surfaces thus keeping the pistons apart in their rest position.

To ensure that attention is drawn to a leaking of a piston sealing a pressure medium exit is provided in form of a groove connecting the space between the two pistons with the chamber in which the indicator switch is placed. This chamber in turn has an exit to atmosphere. Preferably a check valve is arranged in the connecting channel between atmosphere and the space between the two pistons to allow leaking hydraulic fluid to flow out while preventing dust from penetrating into the space between the pistons.

The indicator preferably consists of a synthetic switch pin or cam follower which in the relaxed or rest position of the brakes rests with one end on the housing and with the other end on the two piston front faces. The front faces of the pistons facing each other may be conical, ball-shaped or hollow spheric or with tapered surfaces.

The advantages achieved with this invention is that pressure medium losses are reduced and a quick oscillation of the piston sealings takes place upon each braking action. The manufacture is less expensive because fewer parts are required and a simple spring is used which does not need any adjustment. The simple arrangement of only one switch pin and one indicator light makes the system easy to inspect and thus meets the requirements of reliability of a warning device.

BRIEF DESCRIPTION OF THE DRAWINGS

FIG. 1 is a schematic of a dual brake circuit with a pressure differential indicator embodying the present invention; and FIG. 2 is a cross-sectional view of the pressure differential indicator shown in FIG. 1.

DESCRIPTION OF THE PREFERRED EMBODIMENTS

Referring to the drawings there is shown a dual circuit automotive brake system comprising a tandem master cylinder 30 and separate brake lines 32 and 34 connected to the front and rear wheels 36 and 38 respectively. A pressure differential indicator device 40 is connected between the brake lines leading to the front and rear wheels. An indicating circuit comprising a lamp 42 on the dashboard and associated connections to the battery 44 and ground is provided. Although a visual signal device is shown it will be appreciated that an audible device could also be used.

The warning device or pressure differential indicator 40 comprises a housing 1 with a cylindrical bore 2 having ends 3 and 4 connected to the front and rear wheel brake circuits respectively. Stops 5 and 6 are provided in the cylinder for limiting the outward movement of the pistons. In the cylindrical bore 2 two pistons 7 and 8 are arranged together with seals 9 and 10 to slide one behind the other or one against the other. In rest position the conical ends 11 and 12 contact the synthetic switch pin 13 which is biased inward against the stop 15 by the spring 14. The spring 14 bears on the cap which is fitted into the housing 1. The synthetic switch pin 13 has a metallic contact 17 which transmits the electrical signal to the cable 18.

The invention operates as follows:

Upon approximately even pressure increase in both pressure medium circuits the two pistons 7 and 8 move equal distances towards each other until the ends of the truncated cones 11 and 12 abut. During this movement the conical ends 11 and 12 displace the switch pin 13 to such an extent that the pin is lifted from its stop 15 but less than the amount necessary to close the contact 17. If one of the brake circuits fails the pressure differential across the piston will cause them to move to one side or the other until they abut against one of the abutments 5 or 6. Simultaneously the synthetic switch pin of cam follower 13 is lifted completely out of the hollow space 20 and pressed with its metallic core or contact 17 against the pistons 7 or 8 by the spring 14 such that also in case of vibrations in the housing a reliable electric contact between the pistons 7 or 8 and the core 17 is ensured. The synthetic switch pin 13 has a groove to convey the pressure medium through the space 20 to the chamber 19 and from there through the groove 21 in the cap 16 to atmosphere in case that one of the two seals 9 or 10 leaks. The cap 16 is made such that the pressure medium can flow out while dust is prevented from entering the chamber 20.

While we have described above the principles of our invention in connection with specific apparatus it is to be clearly understood that this description is made only by way of example and not as a limitation to the scope of our invention as set forth in the accompanying claims.

We claim:

1. A pressure differential warning device for dual circuit brake systems of the type comprising two pistons arranged in a closed cylinder with the pressure chambers formed between the outside piston surfaces and the cylinder end walls respectively connected to the separate brake circuits and means responsive to the movement of the pistons for generating a signal when a pressure difference across the pistons causes the pistons to move toward one end of the cylinder, the warning device characterized in that the facing ends of the pistons are tapered toward each other to provide cam surfaces and by a cam follower spring biased against the cam surfaces, a normally open switch having a contact movable with the cam follower and adapted to be closed when the cam follower is moved beyond a predetermined position, and an electric signalling device adapted to be actuated by closing of the contacts, said cam follower holding said two pistons in a spaced relation with respect to each other when they are in their rest position while upon an equal increase in pressure in the separate brake circuits there results a movement of the two pistons an equal amount toward each other until the facing ends of the pistons abut each other and the cam follower is moved by the cam surfaces to a position less than the predetermined position.

2. The invention of claim 1 including means for venting the chamber formed between the pistons to atmosphere.

3. A pressure differential warning device for dual circuit brake systems of the type comprising two pistons arranged in a closed cylinder with the pressure chambers formed between the outside piston surfaces and the cylinder end walls respectively connected to the separate brake circuits and means responsive to the movement of the pistons for generating a signal when a pressure difference across the pistons causes the pistons to move toward one end of the cylinder, the warning device characterized in that the facing ends of the pistons are tapered toward each other to provide cam surfaces and by a cam follower spring biased against the cam surfaces, a normally open switch having a contact movable with the cam follower and adapted to be closed when the cam follower is moved beyond a predetermined position, an electric signalling device adapted to be actuated by closing of the contacts, and means for venting the chamber formed between the pistons to atmosphere, the means for venting the chamber between the pistons including a check valve for preventing foreign matter from entering the brake system.

4. The invention of claim 3 wherein the cam surfaces are conical.

5. The invention of claim 3 wherein the cam surfaces are spherical.

* * * * *